(12) United States Patent
Kamitani

(10) Patent No.: US 7,713,403 B2
(45) Date of Patent: May 11, 2010

(54) WATER TREATMENT METHOD AND APPARATUS

(75) Inventor: Yoshinori Kamitani, Aichi (JP)

(73) Assignee: Hoshizaki Denki Kabushiki Kaisha, Aichi-ken (JP)

( * ) Notice: Subject to any disclaimer, the term of this patent is extended or adjusted under 35 U.S.C. 154(b) by 1112 days.

(21) Appl. No.: 11/281,405

(22) Filed: Nov. 18, 2005

(65) Prior Publication Data

US 2007/0205162 A1  Sep. 6, 2007

(51) Int. Cl.
 *C02F 1/461* (2006.01)
(52) U.S. Cl. .................. 205/701; 205/742; 205/746; 204/263; 204/264
(58) Field of Classification Search .............. 205/701, 205/742, 746; 204/263, 264
See application file for complete search history.

(56) References Cited

U.S. PATENT DOCUMENTS 5,858,202 A * 1/1999 Nakamura .................. 205/746
6,296,744 B1 * 10/2001 Djeiranishvili et al. ...... 204/263

FOREIGN PATENT DOCUMENTS

JP    404045295 A  *  2/1992

* cited by examiner

*Primary Examiner*—Arun S Phasge
(74) *Attorney, Agent, or Firm*—Cheng Law Group, PLLC

(57) ABSTRACT

In a water treatment method, a first embodiment of the treatment method comprises the steps of producing electrolyzed acid water by electrolysis of raw water in an anode chamber of an electrolytic cell with an ion permeable partition membrane; removing volatile component in an acid property of the electrolyzed water; and producing electrolyzed neutral water without the volatile component by electrolysis of the electrolyzed acid water in a cathode chamber of the electrolytic cell.

8 Claims, 5 Drawing Sheets

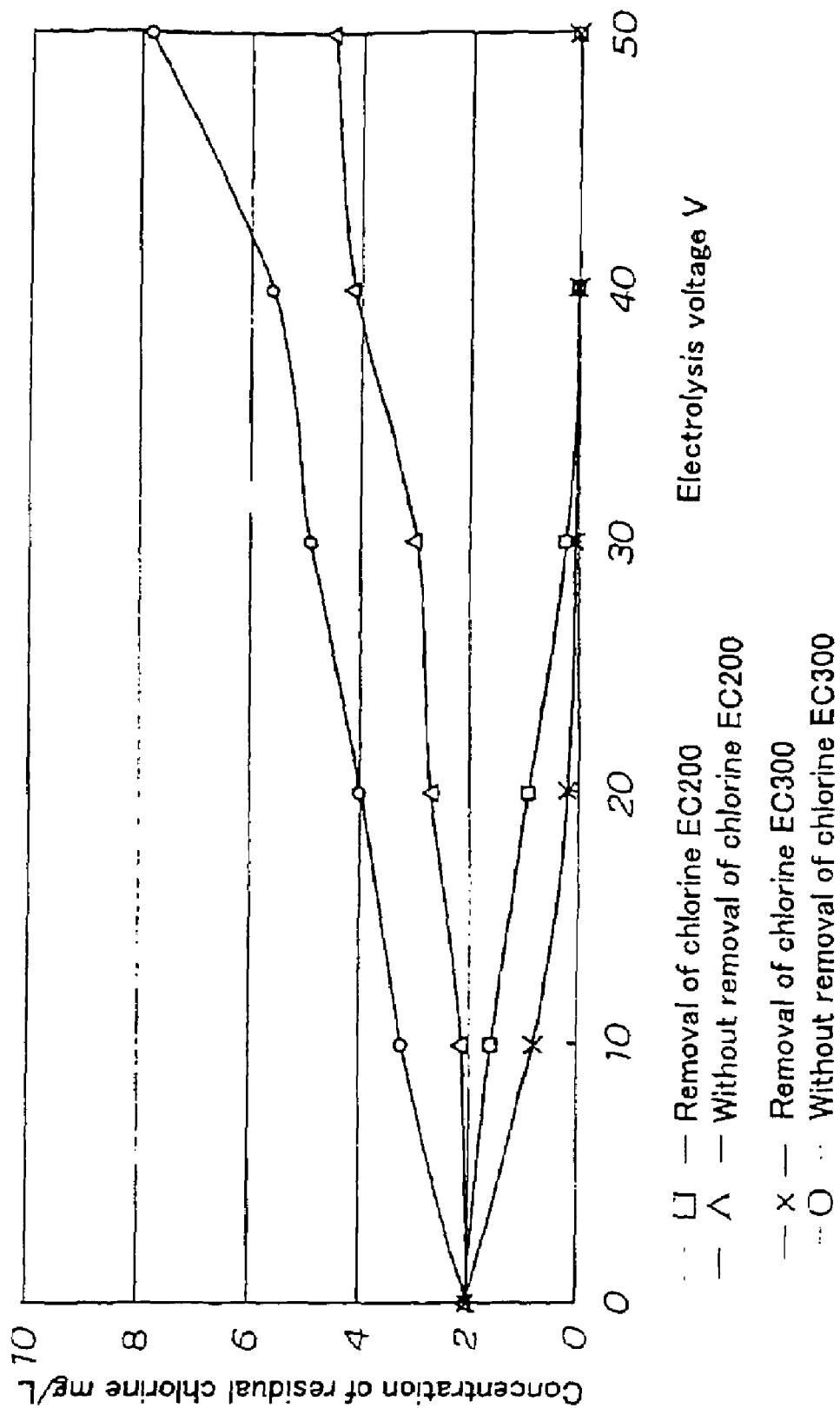

WATER TREATMENT METHOD AND APPARATUS

BACKGROUND OF THE INVENTION

1. Field of the Invention

The present invention relates to a method and an apparatus for treatment of water.

2. Discussion of the Prior Art

Water that is taken into human body for drinking or cooking is required to be treated not to harm human body, and water that is used in direct contact with human body is required to be treated not to bring discomfort to human body. Tap water, in general, is fully sterilized and keep it sterile at faucet which is the distal end of water pipe in order to make it suitable to be taken into human body for drinking, cooking or the like. When raw water is sterilized at a filter plant, the raw water is, in general, treated by strong alkaline sodium hypochlorite (NaOCl) to have less than 100 pieces/mL of coliform *bacillus*, then is neutralized by hydrochloric acid to a given value between pH 5.8-8.6.

In order to keep tap water in a sterile condition just before using, 1 mg/L of hydrochloric acid remains in tap water. Accordingly, tap water contains a small amount of chlorine (Cl) which triggers cancer, atopic dermatitis and odor. Such water for drinking, cooking, washing human body or bathing is undesirable for a person who is sensitive to chlorine. There are some cases that tap water and well water contain a small amount of such as trihalomethane that is carcinogen or trimethylamine that causes odor, besides chlorine.

Recently, it is attempted in a general household to remove chlorine residue of tap water by using various water treating devices. For example, there have been proposed a method of producing alkaline-ion water suitable for drinking without chlorine residue by using an ionized alkaline water production device, a method of producing water without chlorine residue by activated carbon filtration of tap water, a method of producing water without chlorine residue by fine filtration of tap water in use of a special filtration material such as an ultrafiltration membrane.

In the method of producing ionized alkaline water, particular drinking water such as ionized alkaline water is produced, which is not suitable for general use. In the fine filtration method, it is inevitably required to exchange or reproduce the filtration material such as the activated carbon or ultrafiltration membrane. As the treatment apparatus for these methods is small in size, it is impossible to provide all the water for drinking, cooking, washing human body and bathing at home.

SUMMARY OF THE INVENTION

An object of the present invention is to provide a method and an apparatus for treatment of water in which raw water is selectively electrolyzed in cathode and anode chambers of an electrolytic cell with an ion permeable partition membrane to eliminate harmful components to human body thereby to produce neutral water in a substantially sterile condition suitable for various purposes such as drinking, cooking, washing human body, bathing, etc.

According to the present invention, the object is attained by providing a water treatment method comprising the steps of producing electrolyzed acid water by electrolysis of raw water in an anode chamber of an electrolytic cell with an ion permeable partition membrane; removing volatile component in an acid property of the electrolyzed water; and producing electrolyzed neutral water without the volatile component by electrolysis of the electrolyzed acid water in a cathode chamber of the electrolytic cell.

To carry out the water treatment method described above, there is provided a water treatment apparatus which comprises an electrolytic cell with an ion permeable partition membrane; a removal treatment device for removing volatile component in an acid property; a first supply conduit for supplying raw water to an anode chamber of the electrolytic cell; a second supply conduit for supplying electrolyzed acid water produced by electrolysis of the raw water in the anode chamber to the removal treatment device; a third supply conduit for supplying the electrolyzed water without the volatile component to a cathode chamber of the electrolytic cell; and a discharge conduit connected with the cathode chamber to discharge neutral water produced in the cathode chamber.

In the water treatment method and apparatus, volatile components such as chlorine component, trihalomethane in the acid property of the electrolyzed acid water produced in the anode chamber of the electrolytic cell are easily removed by the removal treatment. Thus, the electrolyzed acid water is electrolyzed without the volatile component in the cathode chamber of the electrolytic cell to produce electrolyzed water whose property is weakly acid or weakly alkaline. The electrolyzed water is produced as neutral water without chlorine component in a substantially sterile condition, suitable for drinking, cooking, washing human body, bathing, etc.

According to the present invention, the object can be also attained by providing a water treatment method comprising the steps of producing electrolyzed alkaline water by electrolysis of raw water in a cathode chamber of an electrolytic cell with an ion permeable partition membrane; removing volatile component in an alkaline property of the electrolyzed water; and producing electrolyzed neutral water without the volatile component by electrolysis of the electrolyzed alkaline water in an anode chamber of the electrolytic cell.

To carry out the water treatment method described above, there is provided a water treatment apparatus which comprises an electrolytic cell with an ion permeable partition membrane; a removal treatment device for removing volatile component in an alkaline property; a first supply conduit for supplying raw water to a cathode chamber of the electrolytic cell; a second supply conduit for supplying electrolyzed alkaline water produced by electrolysis of the raw water in the cathode chamber to the removal treatment device; a third supply conduit for supplying the electrolyzed water without the volatile component to an anode chamber of the electrolytic cell; and a discharge conduit connected with the anode chamber to discharge neutral water produced in the anode chamber.

In the water treatment method and apparatus, volatile components such as trimethylamine in the alkaline property of the electrolyzed alkaline water produced in the cathode chamber of the electrolytic cell are easily removed by the removal treatment. Thus, the electrolyzed alkaline water is electrolyzed without the volatile component in the anode chamber of the electrolytic cell to produce neutral water without odor of trimethylamine in a substantially sterile condition, suitable for drinking, cooking, washing human body, bathing, etc.

BRIEF DESCRIPTION OF DRAWINGS

In the drawings,

FIG. 5 is a graph showing a result of treatment in use of the water treatment apparatus.

DESCRIPTION OF PREFERRED EMBODIMENTS

The present invention relates to a treatment method of water and an apparatus for treatment of water. In the water treatment method of the present invention, it is intended to provide a substantially sterile neutral water which does not contain volatile component in acid property such as chlorine component or in alkaline property such as trimethylamine. The neutral water is provided without odor of chlorine or trimethylamine and is useful as water suitable to be taking into human body or used in direct contact with human body such as water for drinking, cooking, washing human body, bathing, etc.

Figure 1:
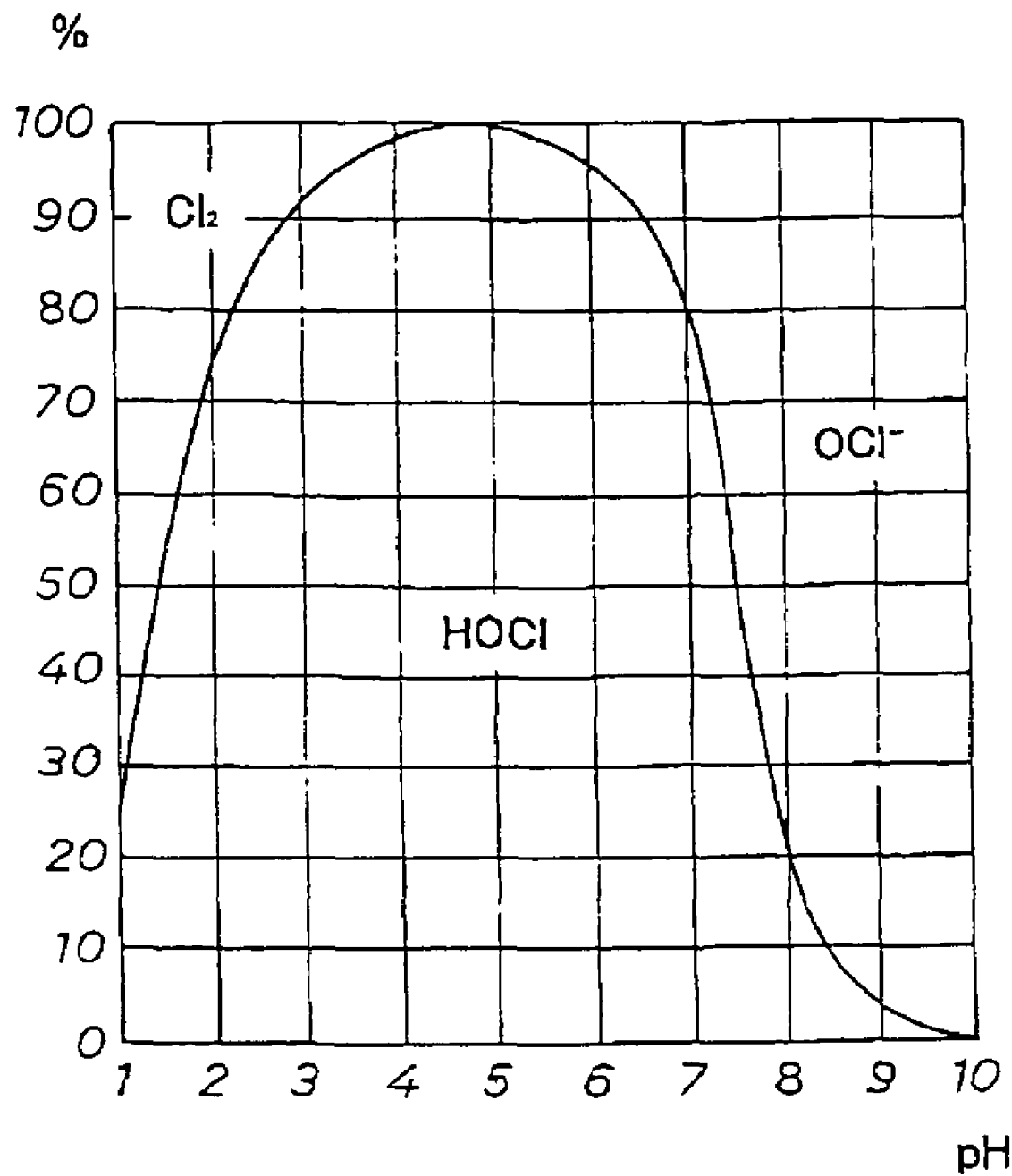
FIG. 1 is a graph showing chlorine component in water in relation to the change of pH.

As shown in FIG. 1, chlorine component in tap water remains in various forms in accordance with the change of pH. The chlorine component remains in the form of $Cl_2$ and HOCl in a strong acid area, in the form of HOCl in a weak acid area to a weak alkaline area, and in the form of $OCl^-$ in a strong alkaline are. The water treatment method and apparatus according to the present invention are focused on the fact that the chlorine component remaining in tap water is volatile and easily removable as shown in FIG. 1. Accordingly, the object of the present invention is directed to provide useful water for various purposes such as water suitable for drinking, cooking, washing human body, bathing, etc.

The first treatment method of the present invention comprises the steps of electrolyzing raw water in an anode chamber of an electrolytic cell with an ion permeable partition membrane to produce electrolyzed acid water, eliminating volatile component in an acid property of the electrolyzed acid water, electrolyzing the electrolyzed acid water in a cathode chamber of the electrolytic cell to produce electrolyzed neutral water. This treatment method can be carried out with a water treatment apparatus shown in FIG. 2.

Figure 2:
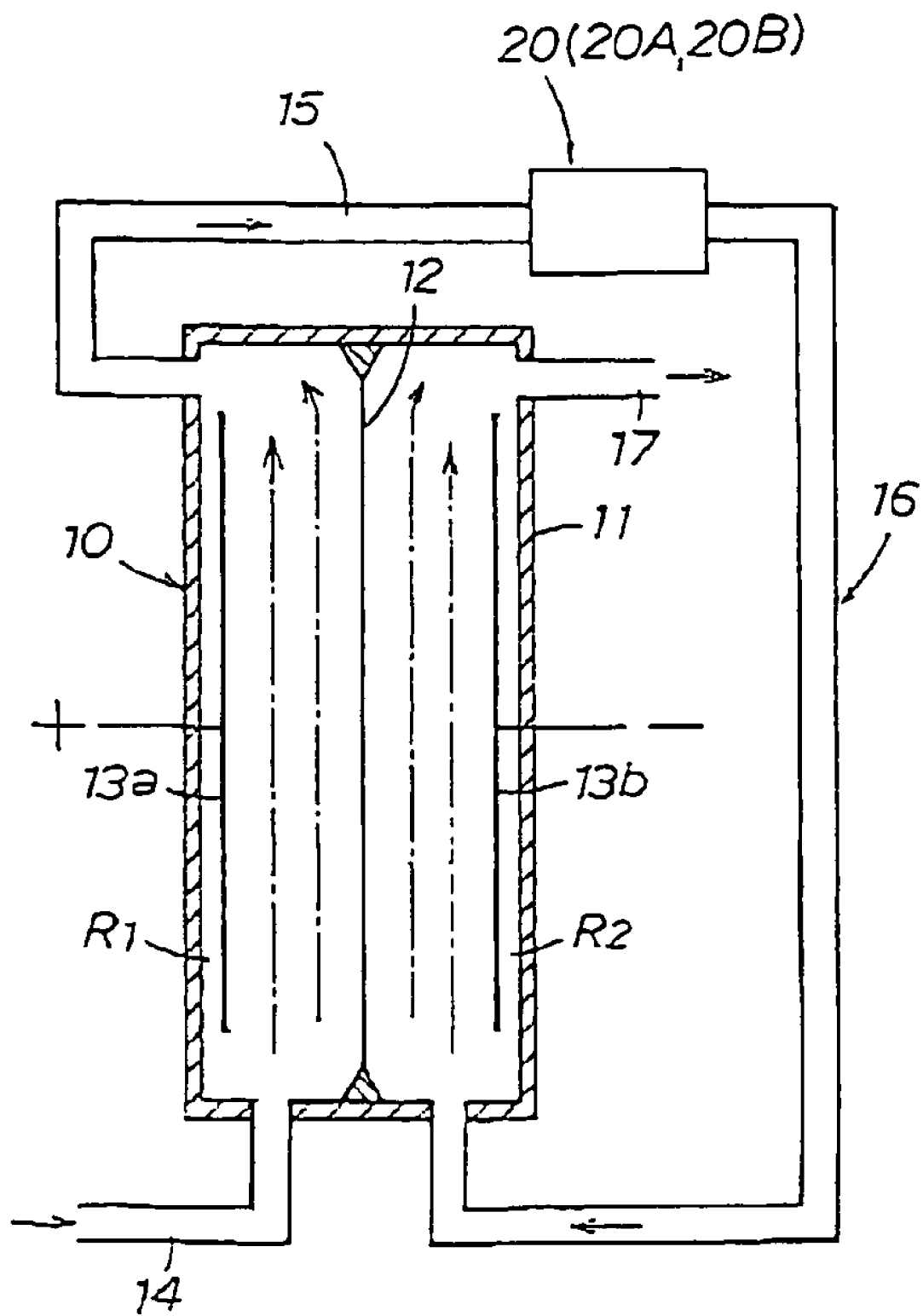
FIG. 2 illustrates an embodiment of a water treatment apparatus in accordance with the present invention.

The water treatment apparatus shown in FIG. 2 is basically composed of an electrolytic cell 10 with an ion permeable partition membrane and a deaeration device 20 for removal of chlorine. In the electrolytic cell 10, the interior of the cell is subdivided into electrode chambers R1 and R2 by means of an ion permeable partition membrane 12. The electrode chambers R1 and R2 are provided therein with positive and negative electrodes 13a and 13b, respectively. In the electrolytic cell 10, the chamber R1 is in the form of an anode chamber, while the chamber R2 is in the form of a cathode chamber.

In the electrolytic cell 10, a first supply conduit 14 is connected to the anode chamber R1, a second supply conduit 15 is connected at one end thereof to the anode chamber R1 and at the other end thereof to the deaeration device 20, a third supply conduit 16 is connected at one end thereof to the deaeration device 20 and at the other end thereof to the cathode chamber R2, and a discharge conduit 17 is connected to the cathode chamber R2. The first supply conduit 14 is provided to supply raw water such as tap water to the anode chamber R1 of the electrolytic cell 10, while the second supply conduit 15 is provided to supply electrolyzed acid water from the anode chamber R1 to the deaeration device 20. Further, the third supply conduit 16 is provided to supply the electrolyzed acid water from the deaeration device 20 to the cathode chamber R2 of the electrolytic cell 10. The deaeration device 20 acts to remove chlorine from the electrolyzed acid water. The discharge conduit 17 is provided to discharge therethrough electrolyzed neutral water from the cathode chamber R2. In thus embodiment, a chlorine removal device 20A of the suction type shown in FIG. 3 or a chlorine removal device 20B of the bubbling type is used as the deaeration device 20.

The chlorine removal device 20A of the suction type shown in FIG. 2 is composed of a tank 21, an introduction pipe 22 meanderingly disposed in the tank 21, a gas exhaust duct 23 and a vacuum pump 24 disposed in the gas exhaust duct 23. The introduction pipe 23 is made of an air-permeable porous material, which is connected at its inlet to the second supply conduit 15 and at its outlet to the third supply conduit 16. When the interior of tank 21 is conditioned under high negative pressure by activation of the vacuum pump 24, volatile component (chlorine component) in the electrolyzed acid water permeates into the interior of tank 21 through the porous wall of introduction pipe 22 and is exhausted through the exhaust duct 23.

Figure 4:
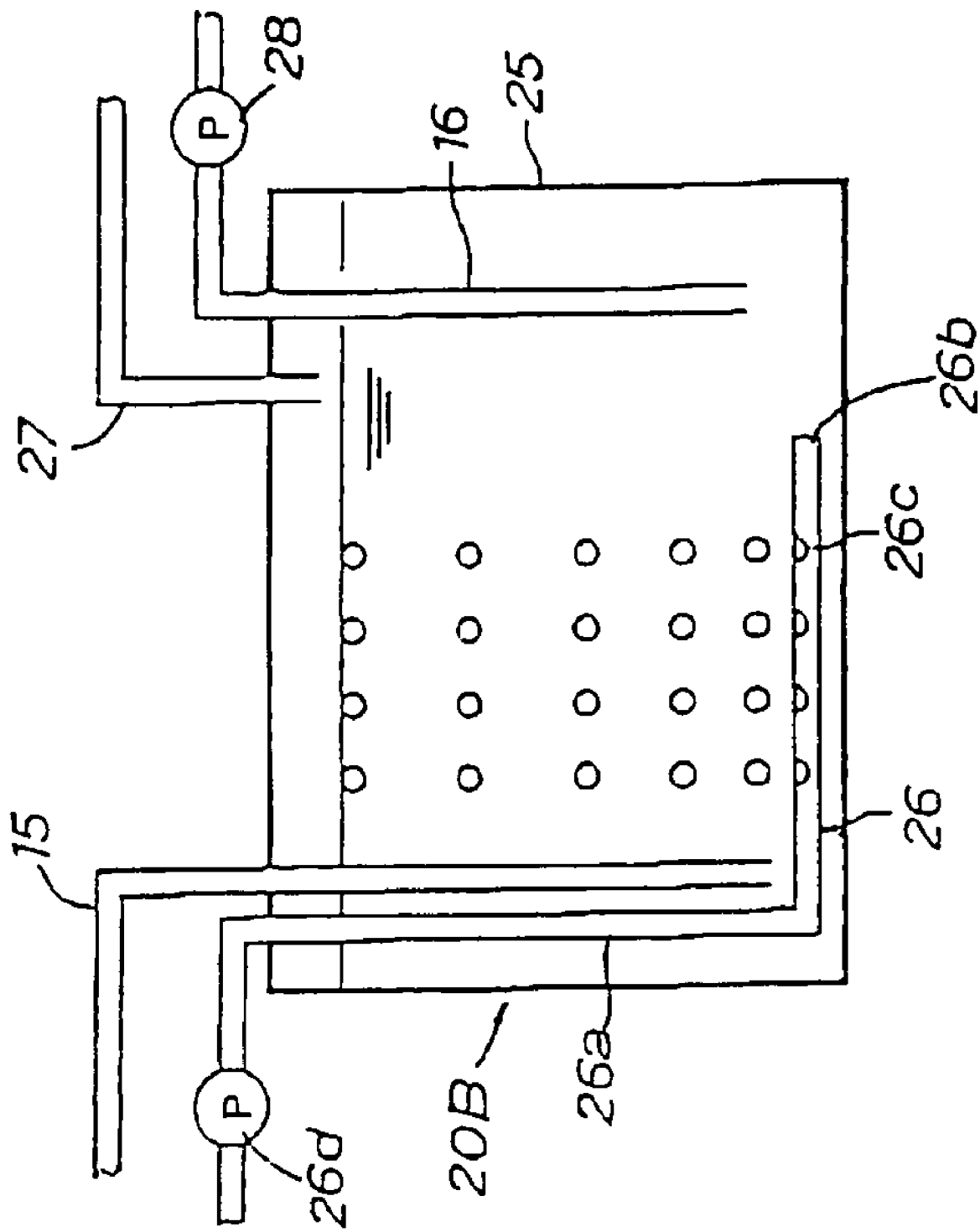
FIG. 4 illustrates another embodiment of a chlorine removal device adapted to the water treatment apparatus shown in FIG. 1.

The chlorine removal device 20B of the bubbling type shown in FIG. 4 is composed of a tank 25, a bubbling pipe 26 disposed to spout air into the interior of tank 25, and a gas exhaust pipe 27 provided to exhaust gas from the tank 25. The bubbling pipe 26 includes an L-shaped main pipe 26a and a straight bubbling pipe 26b extending from the main pipe 26a. The bubbling pipe 26b has a number of spout holes 26c and extends in a given length in the bottom of tank body 25. An air pump 26d is disposed in the main pipe 26a. In the chlorine removal device 20B, the second supply conduit 15 and the third supply conduit 16 are extended into the bottom portion of tank 25. A water pump 28 is disposed in the third supply conduit 16.

In the chlorine removal device 20B, the electrolyzed acid water from the anode chamber R1 of the electrolytic cell is supplied to the interior of tank 25 through the second supply conduit 15, and the electrolyzed acid water stored in tank body 25 is discharged by activation of the water pump 28 and supplied to the cathode chamber R2 of the electrolytic cell 10 through the third supply conduit 16. The air inspired by activation of the air pump 26d is supplied into the bubbling pipe 26 and spouted out into the electrolyzed acid water stored in tank 25 through the spout holes 26c of bubbling pipe portion 26b. The spout out air makes a large number of bubbles in the electrolyzed acid water, which carry chlorine component in the electrolyzed acid water to the upper space of tank 25, then exhausted to the atmosphere through the gas exhaust pipe 27.

In operation of the water treatment apparatus, tap water, for example, is supplied to the anode chamber R1 of the electrolytic cell 10 through the first supply pipe 14 and is electrolyzed in the anode chamber R1 to produce electrolyzed acid water. In turn, the electrolyzed acid water is supplied to the chlorine removal device 20 and sterilized by the function of effective chlorine component in the chlorine removal device 20 to be maintained in an acid condition of pH 3.0~5.0. Thus, the effective chlorine component remaining in the electrolyzed acid water is made in a volatile condition in the form of $Cl_2$ and HOCl in an acid area shown in FIG. 1.

Figure 3:
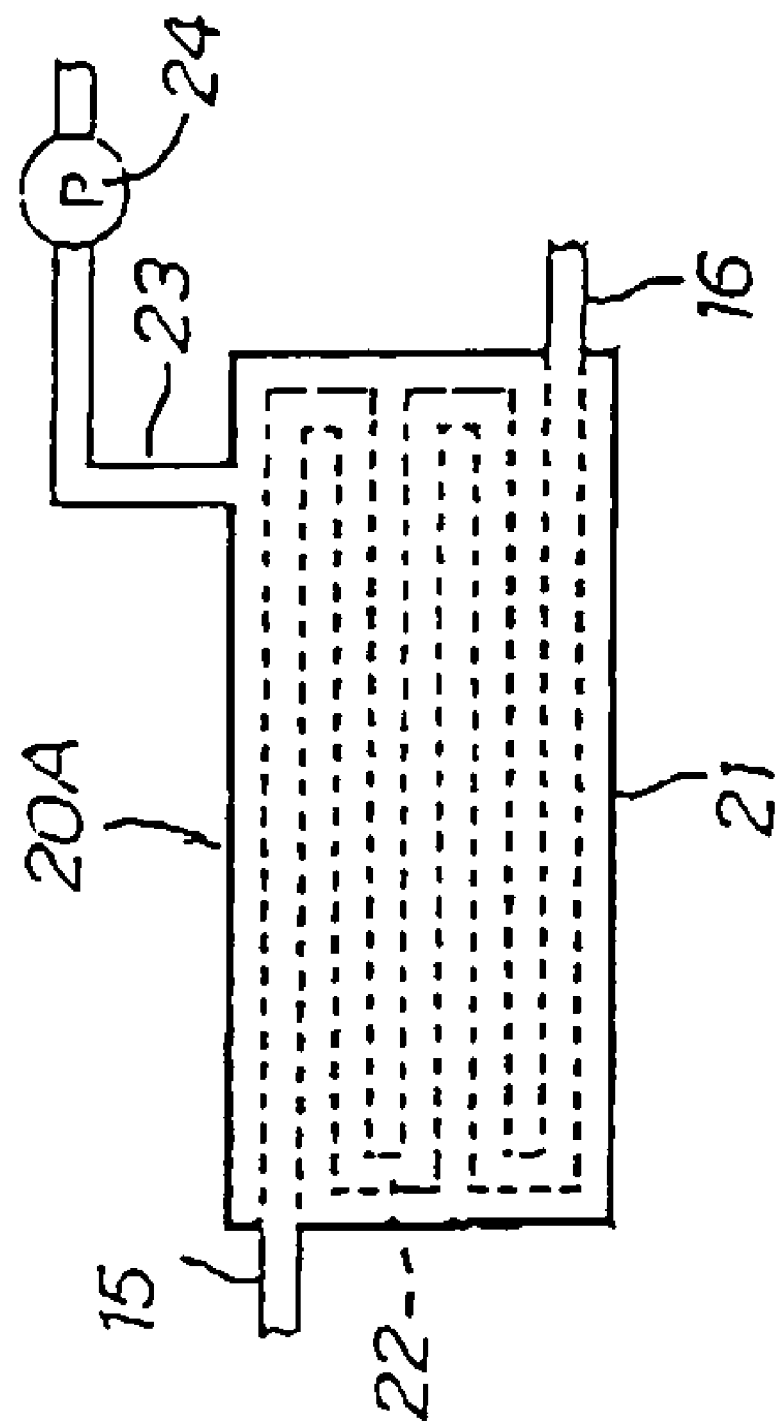
FIG. 3 illustrates an embodiment of a chlorine removal device adapted to the water treatment apparatus shown in FIG. 1.

In the case that the chlorine removal device 20A of the suction type shown in FIG. 3 is adapted to the water treatment apparatus, the electrolyzed acid water form the second supply conduit 15 is introduced into the introduction pipe 22 in tank 21 and supplied to the cathode chamber R2 of electrolytic cell 10 through the introduction pipe 22 and the third supply conduit 16. In such an instance, the interior of tank 21 is conditioned under high negative pressure by activation of the vacuum pump 24 so that the chlorine component in the electrolyzed acid water flowing through the introduction pipe 22 is sucked in the form of gas and exhausted to the exterior through the gas exhaust pipe 23.

The electrolyzed acid water from which chlorine element was removed is supplied to the cathode chamber R2 of electrolytic cell 10 through the third supply pipe 16 as water to be further electrolyzed. Thus, the electrolyzed acid water is electrolyzed in the cathode chamber R2 and discharged through the discharge conduit 17 as neutral water of about pH 6~8 to be used appropriately. The neutral water discharged from the conduit 17 does not contain chlorine component in a sterile condition suitable for drinking, cooking, washing human body, bathing etc.

In the case that chlorine removal device 20B of the bubbling type shown in FIG. 4 is adapted to the water treatment apparatus, the electrolyzed acid water produced in the anode chamber R1 of electrolytic cell 10 is supplied to the tank 25 through the second supply conduit 15. After being stored in the tank 25, the electrolyzed acid water is supplied to the cathode chamber R2 of electrolytic cell 10 through the third supply conduit 16 by activation of the water pump 28. In such an instance, the air spouts out as a large number of bubbles into the electrolyzed acid water in tank 25 through the spout holes 26c of bubbling pipe 26 in activation of the air pump 26d. The large number of bubbles make contact with and carry chlorine component in the electrolyzed acid water to the upper space of tank 25. The air and chlorine gas retained in the upper space of tank body 25 are exhausted to the exterior through the gas exhaust pipe 27.

Although the first water treatment apparatus shown in FIG. 2 is designed to remove volatile components in an acid property, the first water treatment apparatus may be substituted for a second water treatment apparatus in which the anode chamber R1 and cathode chamber R2 of electrolytic cell 10 are replaced with a cathode chamber and an anode chamber. In the second water treatment apparatus, electrolyzed alkaline water is produced by electrolysis of supplied raw water in the cathode chamber, and volatile component in an alkaline property is removed from the electrolyzed alkaline water. Thus, neutral water is produced without the volatile component by electrolysis of the electrolyzedalkaline water in the anode chamber of the electrolytic cell.

Embodiment

In this embodiment, two kinds of water (EC200, EC300) of pH 6.9 and electric conductivity 200 μS/cm, 300 μS/cm were prepared by pure water and table salt. The first water treatment apparatus shown in FIG. 2 was used for treatment of the two kinds of water under different electrolysis voltages. Provided that, the treatment test was carried out in activated and deactivated conditions of the chlorine removal device 20. In FIG. 5, there is shown the concentration of residual chlorine in the treated water in relation to applied electrolysis voltages. The treated water in each test was in the form of electrolyzed neutral water of pH 6~8. In the electrolyzed acid water treated by removal of chlorine (with removal of chlorine; EC200, EC300), it has been found that the concentration of residual chlorine becomes zero. In the electrolyzed acid water not treated by removal of chlorine (without removal of chlorine: EC200, EC300), it has been found that the concentration of residual chlorine becomes higher in accordance with increase of the electrolysis voltage.

The invention claimed is:

1. A water treatment method comprising the steps of:
producing electrolyzed acid water by electrolysis of raw water in an anode chamber of a single electrolytic cell with an ion permeable partition membrane;
removing volatile component including chlorine or trihalomethane in an acid property of the electrolyzed acid water; and
producing electrolyzed neutral water by electrolysis of the electrolyzed acid water in a cathode chamber of the electrolytic cell after removing the volatile component.

2. A water treatment method as set forth in claim 1, wherein deaeration treatment is adapted to remove volatile component in the electrolyzed acid water.

3. A water treatment method comprising the steps of:
producing electrolyzed alkaline water by electrolysis of raw water in a cathode chamber of a single electrolytic cell with an ion permeable partition membrane;
removing volatile component including trimethylamine in an alkaline property of the electrolyzed alkaline water; and
producing electrolyzed neutral water by electrolysis of the electrolyzed alkaline water in an anode chamber of the electrolytic cell after removing the volatile component.

4. A water treatment method as set forth in claim 3, wherein deaeration treatment is adapted to remove volatile component in the electrolyzed alkaline water.

5. A water treatment apparatus comprising:
a single electrolytic cell having an anode chamber and a cathode chamber divided by means of an ion permeable partition membrane;
a first supply conduit for supplying raw water into the anode chamber of the electrolytic cell;
a deaeration device connected with the anode chamber of said electrolytic cell for removing volatile component in an acid property of electrolyzed acid water produced by electrolysis of the raw water in the anode chamber and supplied therefrom;
a second supply conduit for supplying the electrolyzed acid water from said deaeration device to the cathode chamber of said electrolytic cell after removal of the volatile component; and
a discharge conduit connected with the cathode chamber to discharge neutral water produced by electrolysis of the electrolyzed acid water in the cathode chamber.

6. A water treatment apparatus as set forth in claim 5, wherein the deaeration device is adapted to remove chlorine component or trihalomethane in the acid property of the electrolyzed acid water.

7. A water treatment apparatus comprising:
a single electrolytic cell having an anode chamber and a cathode chamber divided by means of an ion permeable partition membrane;
a first supply conduit for supplying raw water into the cathode chamber of the electrolytic cell;
a deaeration device connected with the cathode chamber of said electrolytic cell for removing volatile component in an alkaline property of electrolyzed alkaline water produced by electrolysis of the raw water in the cathode chamber and supplied therefrom;
a second supply conduit for supplying the electrolyzed alkaline water from said deaceation device to the anode chamber of said electrolytic cell after removal of the volatile component; and
a discharge conduit connected with the anode chamber to discharge neutral water produced by electrolysis of the electrolyzed alkaline water in the anode chamber.

8. A water treatment apparatus as set forth in claim 7, wherein a the deaeration device is adapted to remove trimethylamine in the alkaline property of the electrolyzed alkaline water.

* * * * *